Figure 1:
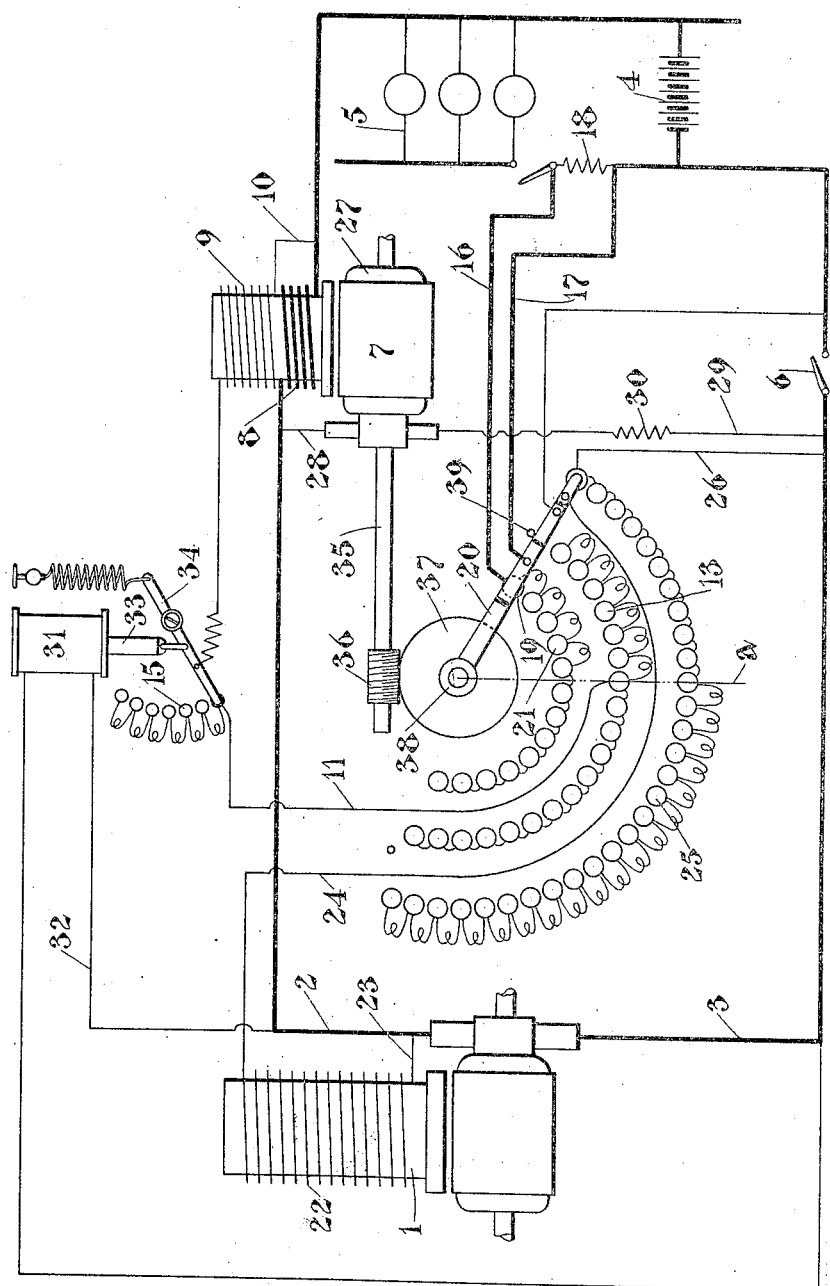

No. 835,487. PATENTED NOV. 6, 1906.
J. L. CREVELING.
SYSTEM OF ELECTRICAL REGULATION.
APPLICATION FILED DEC. 19, 1903.

2 SHEETS—SHEET 1.

WITNESSES:

INVENTOR
John L. Creveling
BY
ATTORNEYS

No. 835,487. PATENTED NOV. 6, 1906.
J. L. CREVELING.
SYSTEM OF ELECTRICAL REGULATION.
APPLICATION FILED DEC. 19, 1903.
2 SHEETS—SHEET 2.
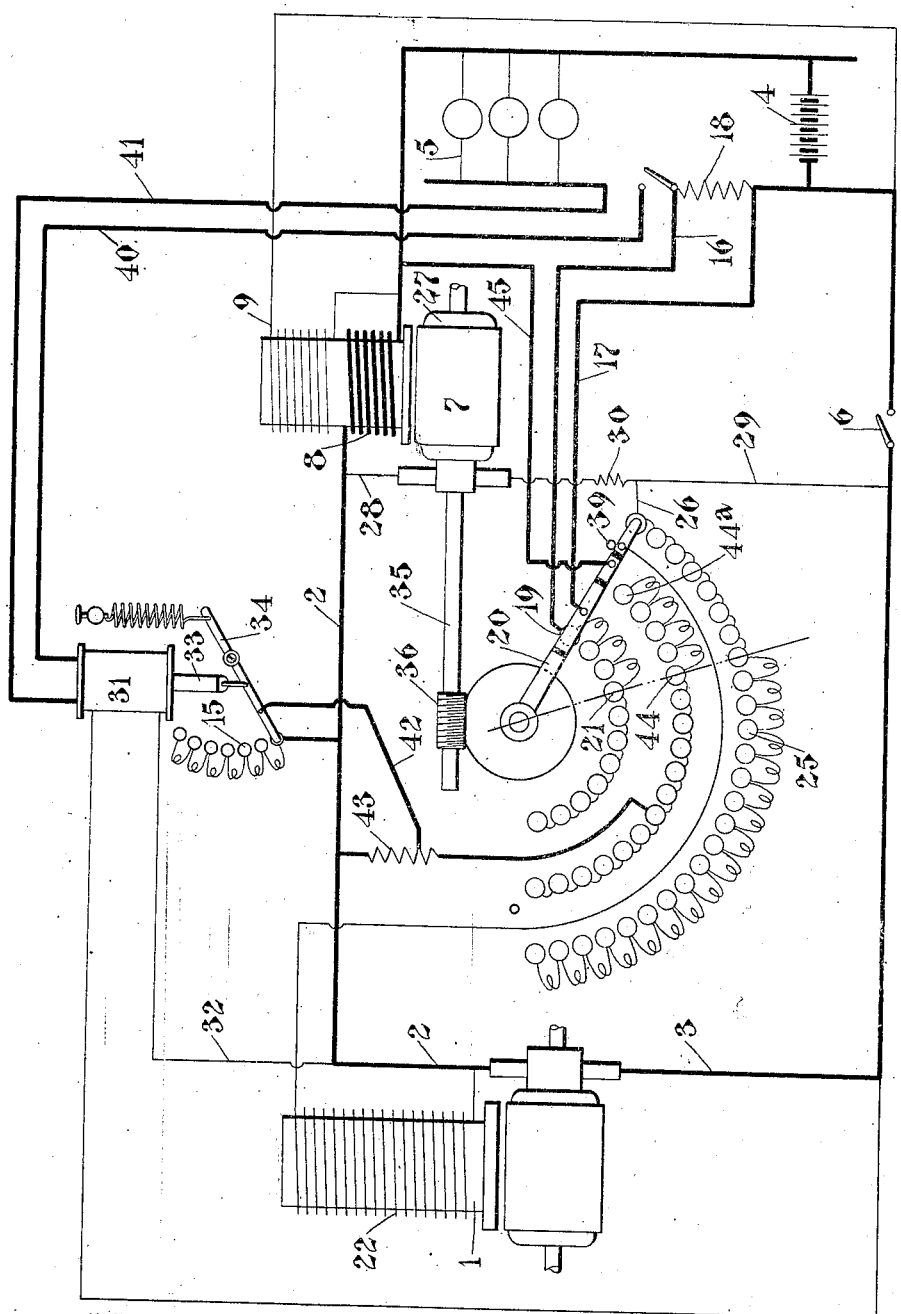
Fig. II.
WITNESSES:
INVENTOR
BY
ATTORNEYS

UNITED STATES PATENT OFFICE.

JOHN L. CREVELING, OF CRONLY, NORTH CAROLINA.

SYSTEM OF ELECTRICAL REGULATION.

No. 835,487.      Specification of Letters Patent.      Patented Nov. 6, 1906.

Original application filed February 12, 1902, Serial No. 93,775. Divided and this application filed December 19, 1903. Serial No. 185,893.

*To all whom it may concern:*

Be it known that I, JOHN L. CREVELING, a citizen of the United States, residing in Cronly, county of Columbus, State of North Carolina, have invented certain new and useful Improvements in Systems of Electrical Regulation, of which the following is a specification.

My invention relates to systems of electrical regulation, and has for its primary object to produce means for charging storage batteries from a generator running at variable speeds and to maintain a desired constant voltage upon the work-circuit.

A further object of my invention is to produce a construction whereby when the batteries shall have reached a certain voltage—say, for example, when they have become practically charged—the charging rate will be automatically changed, it being well understood that the voltage necessary to charge the cells at the ordinary normal rate will remain almost constant until the cells are practically charged, when a considerable rise in voltage is necessary to maintain this normal charging-current. I have shown means which when this rise in voltage takes place operate to lessen the charging rate, thereby avoiding a useless waste of current and evaporation of electrolyte due to violent gasing of the cells.

My invention also, broadly considered, embodies a regulator adapted to maintain a constant current from a generator driven at variable speed and an independent regulator for maintaining the current which the regulator shall hold constant.

In the following drawings I have shown several means for carrying out my invention.

In Figure I, I have shown means for carrying out my invention in which the regulation is effected through the field of a regulator-motor. In Fig. II, I have shown a similar arrangement in which the construction is slightly modified.

My invention relates to systems of electrical distribution.

In the accompanying drawings I have shown in diagram several forms of my invention.

The invention will hereinafter be very particularly set forth and claimed.

This application is a division of the application upon which Patent No. 747,686 was granted to me December 22, 1903.

In the drawings, Fig. I shows a form of my invention wherein the regulation of the lamps and the battery is effected in a certain manner and the determining-regulator is in shunt to the generator-mains. In Fig. II, I have shown another construction.

In the drawings, 1 indicates a generator driven at variable speeds. This generator in the present instance is driven from the axle of a moving car after the manner of the ordinary storage-battery car systems, 2 and 3 representing the generator-mains, which extend to a suitable storage battery 4 and lamp or translation circuit 5. A suitable line-switch 6 may be interposed in the generator-main circuit.

7 is a regulator, herein shown as a motor, one of whose field-coils 8 is in the generator-main circuit and its other field-coil 9, which opposes the coil 8, is at predetermined times included in shunt to the battery-circuit through wires 10 11, rheostat 13, and wire 14. The circuit of the battery field-coil 9 also includes at predetermined times the rheostat 15, as will be explained. Included in the line 2 are suitable wires 16 17, one of which runs to the switch-arm 20 and the other to the first contact 19 of the rheostat 21.

I have shown the generator 1 as being provided with a shunt-field 22, which is connected by a wire 23 to one of the generator-mains and through wire 24, rheostat 25, and wire 26 with the other generator-main. The armature 27 of the regulator-motor is shown as connected across the mains by wires 28 and 29 and a suitable resistance 30. A solenoid at 31 or other suitable device is shown as providing means whereby upon the rise of the batteries to a predetermined voltage the charging rate may be changed.

In the various forms of my invention, which, for the sake of convenience, I have illustrated diagrammatically, I have shown a solenoid at 31 as performing this function. This solenoid at 31 is in Fig. I shown as connected in shunt across the dynamo-mains by the wires 32 and as provided with a core 33, operating a pivoted contact-arm 34, which coöperates with the rheostat 15.

In each of the figures I have shown a line *a*, which indicates the position of the switch-arm 20 when the field is receiving full current and the lamps have the proper amount of resistance in circuit therewith and the battery field-coil of the regulator-motor has the proper amount of resistance therein. This position indicates the lowest speed at which the generator gives its normal output, which output remains constant throughout increases of speed.

The armature-shaft 35 of the regulator-motor is shown as provided with a worm 36, which meshes with a gear 37, which drives the arm 20, preferably by means of a frictional connection 38.

The operation of the device is as follows: The parts being supposed to be in the positions shown in the figures, the generator 1 is started up, and upon reaching a critical speed, owing to the fact that the generator shunt-coil 22 receives full current, the generator will have its normal voltage, the armature 27 of the regulator-motor also receiving current, but the field of the motor is not excited. When the voltage rises to a predetermined degree, the line-switch 6 closes the generator-circuit. When the generator-circuit has been completed, the field-coil 8 of the regulator-motor will receive any current delivered by the generator to the battery or consumption-circuit. This current will tend to excite the field of the regulator-motor and cause the motor-armature to rotate so as to move the switch-arm 20 to the left, which, by its movement, immediately cuts the regulator-motor field-coil 9 into circuit through the resistance 13 and introduces resistance into the lamp-circuit to compensate for the rise in voltage. As the output rises resistance will be cut out of the battery field-coil circuit 9 and more resistance will be cut into the lamp-circuit until the normal line $a$ is reached, when the lamps will have all of their resistance in circuit and the battery field-coil 9 of the regulator-motor will be receiving its full current. Upon any further rise in the output of the generator due to a further change in the speed the switch-arm 20 will begin to cut the resistance 25 into the field-circuit of the generator and to thereby cut down the field and maintain a practically constant output. This it does by the action of the coil 8 opposing the action of the coil 9 and overpowering it, thereby causing the switch-arm 20 to move farther to the left, so as to cut down the generator shunt-field upon an increase of output. So far the solenoid 31 has not come into action and the cells are being charged at their normal rate; but let it be supposed that this charging be continued until the cells have become nearly charged, so that a considerable rise in voltage will be necessary to maintain this normal rate. When this occurs, the solenoid will operate to change the rate to lessen it, thereby avoiding useless waste of current and evaporation of electrolyte due to violent gasing of the cells. This is accomplished upon a rise in voltage by the solenoid 31 raising its core 33 so as to cut a portion or all of the resistance 15 into the circuit of the field-coil 9 of the regulator-motor. This will weaken the field-coil 9, and the field-coil 8 will cause the armature 7 of the regulator-motor to revolve in such direction as to decrease the output of the generator until the effect of the current flowing from the generator through the coil 8 will practically balance the reduced effect of coil 9. Now if the solenoid 31 shall have caused the output of the generator to have been so lessened as to be less than the current used in the consumption-circuit and if the lamps or other translation devices now be turned on they would tend to consume more current than given out by the generator. This, however, would cause a drop in the difference of potential across the mains, and thus across the solenoid 31, weakening the same and allowing the core 33 to gradually lower and cut out resistance 15, thereby giving to the coil 9 practically its original full strength, and thus adjusting the regulator-motor to cause the generator to deliver practically its full normal current, so long as the lamps or consumption-circuit remain connected.

In Fig. II, I have shown a similar arrangement in which similar characters of reference indicate corresponding parts. In this figure the solenoid 31 is shown as having an opposing winding in circuit through wires 40 41 in the lamp-circuit and operates to vary the resistance 15, which, by the wire 42, resistance 43, rheostat 44, and wire 45, is in shunt with the coil 8 of the regulator-motor after the arm 20 has come in contact with the end contact 44ª of the rheostat 44. In this form of my invention the charging rate is determined by the solenoid 31 and is varied by varying the effect of the coil 8 by placing more or less resistance in shunt therewith.

The function of the opposing winding 40 and 41 upon the solenoid is practically as follows: When the lamp-circuit is open, as indicated in the figure, no current will flow through the wires 40 and 41, and the operation of the solenoid 31 will be as outlined with regard to Fig. I before the lamps were considered as thrown on in said figure. Should the batteries have been charged and the solenoid 31 have caused the charging rate to have been lessened, the closing of the lamp-switch will cause the lamp-current to flow through the differential winding 40 41 of the solenoid 31, causing the generator to deliver, if desired, its full normal output so long as the lamp-circuit remains closed, thus weakening the solenoid 31 and causing the generator to deliver as nearly as desired its full normal output.

It will be obvious that I do not confine my invention to the constructions shown in the drawings; but in view of the fact that the various parts are interchangeable I desire to include within the terms of my claims all structures which, in view of the state of the art, may be equivalent structures.

Having described my invention, what I desire to secure by Letters Patent is—

1. The combination of a generator, a storage battery charged thereby, a translation-circuit, a regulator for the generator serving to maintain given current outputs, and means determining said outputs, dependent upon the voltage of the battery and upon the current in the translation-circuit.

2. The combination of a generator, a storage battery charged thereby, a translation-circuit, a regulator for the generator serving to maintain given current outputs, means determining said outputs dependent upon the voltage of the battery and upon current in the translation-circuit, said means acting upon the regulator, substantially as set forth.

3. The combination with a generator, a storage battery, a translation-circuit of a regulator-controlling current delivered by the generator, and means varying said current dependent upon the voltage and current of the translation-circuit.

4. The combination of a generator, a storage battery and translation-circuit of a regulator maintaining the current-output of the generator constant throughout changes in speed of means varying the output to be held constant dependent upon the current and voltage of the translation-circuit.

5. The combination with a generator, a storage battery and translation-circuit of means maintaining the current delivered by the generator substantially constant throughout changes in speed of said generator, of means determining said current to be maintained, dependent upon the voltage of the storage battery, and means modifying said determination dependent upon the energy consumed in the translation-circuit.

6. The combination of a generator, a storage battery charged thereby, a translation-circuit, an electromagnetic regulator for the generator serving to maintain given current-outputs, and means determining said output dependent upon the voltage of the battery and the activity of the translation-circuit, the said means operating to vary an electromagnetic effect in the regulator.

7. In combination, a generator, a storage battery charged thereby, a translation-circuit, means regulating the output of the generator, means varying the output depending for its operation upon the voltage of the storage battery, and means depending for operation on the activity of the translation-circuit affecting said regulator.

In testimony whereof I have hereunto signed my name to the foregoing specification this the 9th day of December, 1903.

JOHN L. CREVELING.

Witnesses:
M. L. BARMORE,
S. E. MORSE.